United States Patent [19]

Burdick

[11] 3,914,701
[45] Oct. 21, 1975

[54] INDICATOR APPARATUS FOR DEVELOPING OUTPUT INDICATIONS INDICATIVE OF INPUT SIGNALS

[76] Inventor: Neal M. Burdick, 1442 NW. 45th, Oklahoma City, Okla.

[22] Filed: Dec. 3, 1973

[21] Appl. No.: 421,025

Related U.S. Application Data

[63] Continuation-in-part of Ser. No. 294,380, Oct. 2, 1972, Pat. No. 3,818,341.

[52] U.S. Cl............. 328/151; 307/235 R; 328/115; 328/127; 328/132
[51] Int. Cl.² ......................................... H03K 5/20
[58] Field of Search .......................... 328/115–117, 328/127, 151, 132; 307/234, 235 R

[56] References Cited
UNITED STATES PATENTS

| | | |
|---|---|---|
| 2,996,624 | 8/1961 | Mumma............................ 328/151 |
| 3,567,966 | 3/1971 | Gilbert et al........................ 307/234 |
| 3,602,825 | 8/1971 | Senior............................ 328/151 X |

Primary Examiner—John Zazworsky
Attorney, Agent, or Firm—Dunlap & Codding

[57] ABSTRACT

The present disclosure contemplates an improved indicator apparatus receiving an input signal from a transducer or the like, developing a sample signal in response thereto, and holding and displaying the developed sample signal, the indicator apparatus integrating the received, input signal and developing the sample signal in response to a sensed, integrated input signal of a predetermined minimum value. The indicator apparatus also generates a trigger signal indicating the development of the sample signal and a control preventing the development of subsequent sample signals until the indicator apparatus is reset.

13 Claims, 5 Drawing Figures

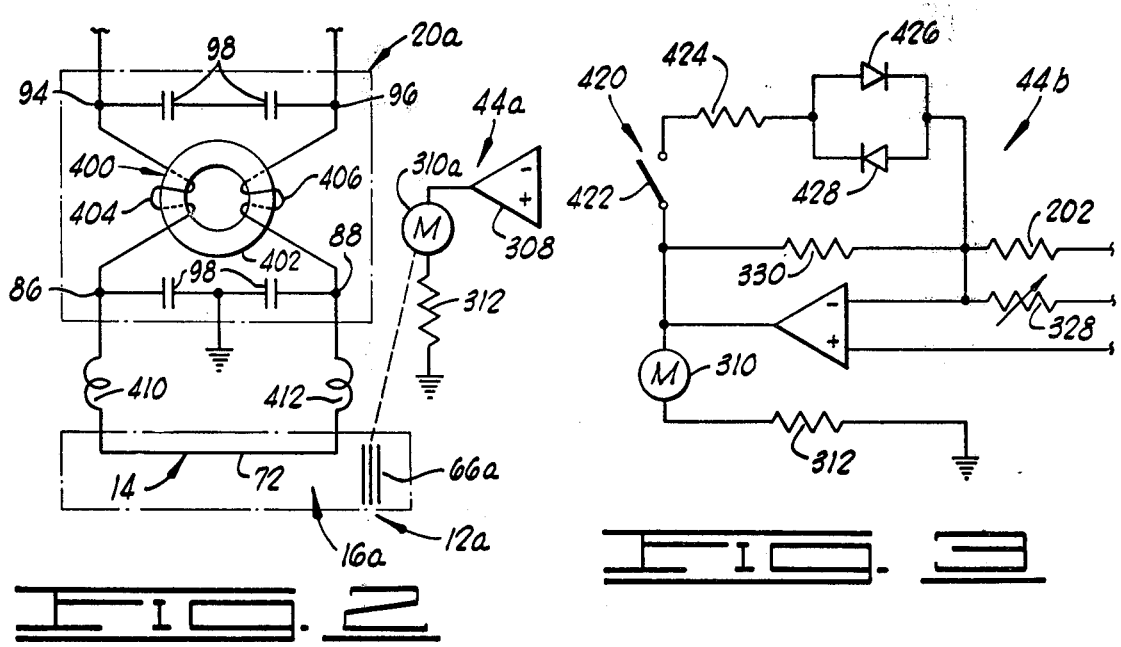

INDICATOR APPARATUS FOR DEVELOPING OUTPUT INDICATIONS INDICATIVE OF INPUT SIGNALS

CROSS-REFERENCE TO RELATED APPLICATIONS

The present application is a continuation-in-part of the applicant's copending application entitled "Apparatus for Providing Output Indications Responsive to the Movement of a Moving Body", Ser. No. 294,380, filed Oct. 2, 1972, now U.S. Pat. No. 3,818,341.

BACKGROUND OF THE INVENTION

This invention relates generally to improvements in indicator devices and, more particularly, but not by way of limitation, to an improved indicator apparatus providing an output indication indicative of an input signal.

SUMMARY OF THE INVENTION

An object of the invention is to provide an improved apparatus for sensing and providing output indications of an input signal in a faster, more efficient and more economical manner.

Yet another object of the invention is to provide an improved low pass filter network.

Still another object of the invention is to provide an improved active filter network.

One other object of the invention is to provide an improved control circuit for receiving an input signal and developing a sample signal indicative thereof in response to a predetermined, sensed condition in a faster, more efficient and more economical manner.

A further object of the invention is to provide an improved input signal indicating apparatus which is economical in the construction and the operation thereof.

Other objects and advantages of the invention will be evident from the following detailed description when read in conjunction with the accompanying drawings which illustrate the various embodiments of the invention.

BRIEF DESCRIPTION OF THE DRAWINGS

FIG. 2 is a partial, diagrammatic, schematic view of a modified indicator apparatus having a modified low pass filter network and a modified means for producing the magnetic field.

FIG. 3 is a partial, schematic, diagrammatic view showing a modified meter network which can be utilized in the indicator apparatus of FIG. 1.

DESCRIPTION OF THE PREFERRED EMBODIMENT

Figure 1:
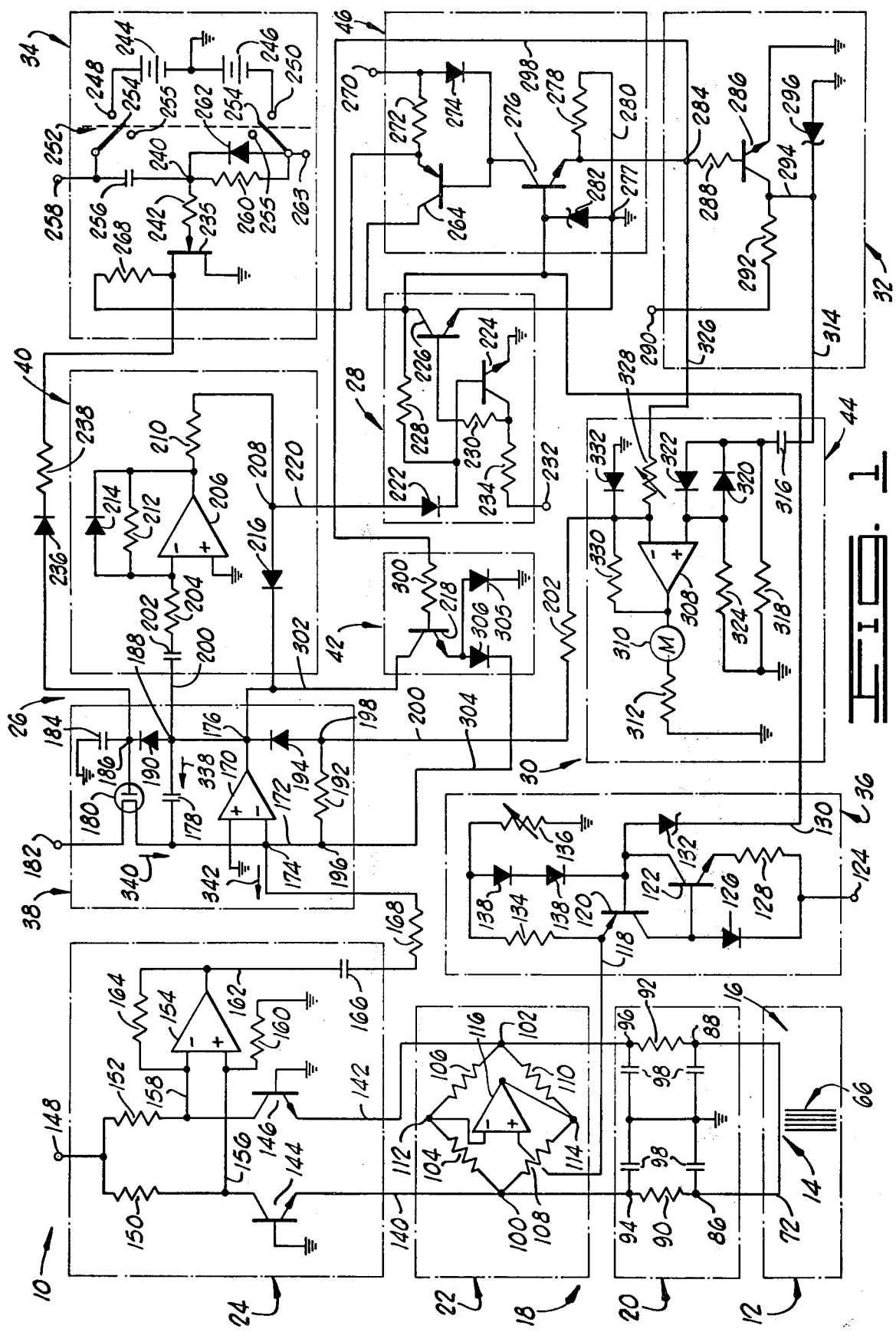
FIG. 1 is a schematic, diagrammatic view of the indicator apparatus of the present invention.

Referring to the drawings in general, and to FIG. 1 in particular, shown therein and designated by the general reference numeral 10 is an indicator apparatus providing a convenient, economical, efficient and, in one form, portable apparatus for sensing a parameter, condition, status or the like and providing an output indication indicative of the sensed parameter, condition, status or the like. The indicator apparatus 10 is particularly suitable for indicating the velocity of a moving object such as a golf club, a golf ball or the like, for example, and one embodiment of the present invention adapted for indicating the velocity of a moving object was disclosed in detail in the applicant's copending application entitled "Apparatus for Providing Output Indications Responsive to the Movement of a Moving Body", Ser. No. 294,380, filed on Oct. 2, 1972, now U.S. Pat. No. 3,818,341.

As shown in FIG. 1, the indicator apparatus 10 includes a transducer 12 having a sensor 14 constructed and positioned to sense the parameter to be measured or indicated and, in one form, a signal transducer 16 connected to the sensor 14 generating an input electrical signal responsive to and indicative of the parameter sensed by the sensor 14 or, in a preferred embodiment, the velocity of the moving object striking the sensor 14. The input signal produced via the transducerr 12 is connected to a filter network 18, including a low pass filter network 20 and an active filter network 22, and to an amplifier network 24, the filtered and amplified input signal from the amplifier network 24 being connected to a delay and sample network 26.

In general, the delay and sample network 26 is constructed to receive the input signal generated via the transducer 12, to sense that a portion of the transducer 12 has been moved a predetermined distance or, more particularly, to sense the integral of the input signal and to develop a sample signal and a trigger signal in response to a sensed integrated input signal of a predetermined minimum value. The developed sample signal is held via the indicator apparatus 10 and the developed trigger signal is utilized to indicate that the sample signal has been developed via the delay and sample network 26, in a manner and for reasons to be described in greater detail below.

Referring more specifically to the indicator apparatus 10 constructed to provide an output indication indicative of the velocity of a moving object, the delay and sample network 26 receives the input signal generated via the transducer 12 and senses that a portion of the transducer 12 has been moved a predetermined distance via the moving object, the delay and sample network 26 sensing the integral of the input signal and developing a sample signal indicative of the velocity of the moving object in response to a sensed integrated input signal shift from an initial predetermined value to a predetermined minimum value. In this embodiment of the invention, the trigger signal generated via the delay and sample network 26 indicates that a sample signal proportional to the input signal and indicative of the velocity of the moving object has been developed via the delay and sample network 26. The developed sample signal is held in the indicator apparatus 10 until the indicator apparatus 10 has been reset to receive subsequent input signals and develop subsequent samples in response thereto in a manner generally described before. The trigger signal from the delay and sample network 26 is connected to and received by a control signal generator 28 which is constructed to generate or produce a control signal in response to the received trigger signal.

The indicator apparatus 10 is, in one preferred form, constructed to be positioned in what is sometimes referred to herein as a "sampled position" wherein the various components and assemblies are positioned to substantially prevent or block subsequent sampling of input signals induced therein via the transducer 12 after the initiation of the control signal or, in other words, after the delay and sample network 26 has sensed an integrated input signal of a predetermined value. The indicator apparatus 10 remains in the "sampled position" until reset for receiving, sampling and indicating subsequently induced input signals, in a manner and for reasons to be made more apparent below.

The sample signal proportional to the input signal developed in the delay and sample network 26 is connected to an output indicator 30. The output indicator 30 is connected to the delay and sample network 26 and to the control signal generator 28, the output indicator 30 being constructed to provide an operator-perceivable output indication indicative of the sample signal in response to the received sample signal from the delay and sample network 26. The output indicator 30 also provides output indications indicating the development of the sample signal and indicating the resetting of the indicator apparatus 10 for receiving subsequently induced input signals in a manner to be described in greater detail below. The operator-perceivable output indications of the output indicator 30 can take the form of a digital type read-out, a recording on a chart or the like, a motor needle position relative to a meter scale or, in one preferred form, a dial indication of a null type meter or various combinations of the mentioned indications, the last-mentioned form of output indication being shown in FIG. 1 and being described in greater detail below.

In one preferred embodiment, shown in FIG. 1, the indicator apparatus 10 and, more particularly, the output indicator 30 includes a sample indicator 32 having a portion connected to the control signal generator 28 receiving the control signal therefrom and cooperating to provide operator-perceivable output indications indicative that the indicator apparatus 10 has been turned-on and reset, or that the sample signal has been developed and the indicator apparatus 10 has been positioned to provide additional operator-perceivable output indications via the output indicator 30 indicative of the input signal. The operator-perceivable output indication produced via the sample indicator 32 can take the form of a light indicator such as via a light emitting diode or the like when indicating that the indicator apparatus 10 has been turned on and reset or that the sample signal has been developed, or via a meter needle position or movement or the like, or via a light and digital read-out, for example. The indicator apparatus 10, as shown in FIG. 1, more particularly, utilizes a meter and the meter-needle swing to provide some of the last-mentioned output indications in a manner to be described in greater detail below.

A reset network 34 is connected to the indicator apparatus 10 for positioning the various components and assemblies to receive and provide output indications of subsequently induced input signals, in a manner to be described in greater detail below.

In one preferred embodiment, as shown in FIG. 1, the amplifier network 24 is biased via a bias control 36 in an activated position of the bias control 36, the bias control 36 being connected to the amplifier network 24 via the active filter network 22. The bias control 36 is connected to the control signal generator 28 and receives the control signal therefrom, the amplifier network 24 being deactivated in response to the received control signal.

As schematically shown in FIG. 1, the delay and sample network 26, more particularly, includes a peak detector 38, a trigger signal generator 40 and a hold network 42. The output indicator 30, more particularly, includes the sample indicator 32, a meter network 44 and a reference network 46.

The peak detector 38 is connected to the trigger signal generator 40, a portion of the peak detector 38 developing the sample signal and providing a signal connected to the trigger signal generator 40 for generating the trigger signal in response to the development of the sample signal. More particularly, the peak detector 38 is constructed to delay the developing of the sample signal until the integral of the input signal shifts from an initial predetermined level to a second, predetermined level or, in other words, until the integral of the input signal reaches a predetermined minimum level thereby substantially preventing the premature sampling of the input signal induced via the transducer 12. The predetermined level of the integrated input signal initiating the trigger signal and the control signal is, in a preferred form, of a magnitude and delayed a period of time sufficient to prevent the premature sampling of the sample signal for substantially assuring the sample signal developed in response to the input signal induced in the indicator apparatus 10 via the transducer 12 is indicative of the desired parameter such as the velocity of the moving object, for example, in a manner and for reasons to be described in greater detail below.

The voltage proportional to or indicative of the velocity of the moving object or, in other words, the sample signal developed in the peak detector 38 is connected to the meter network 44, the meter network 44 receiving the sample signal and providing the operator-perceivable output indication indicative of the input signal. The meter network 44 is connected to the reference network 46, and the reference network 46 is connected to the control signal generator 28 for receiving the control signal therefrom. The reference network 46 is constructed to develop a predetermined voltage reference signal (sometimes referred to herein simply as a "reference signal") in response to the received control signal, the reference signal being connected to the meter network 44 for reasons and in a manner to be made more apparent below.

The hold network 42 is connected to the peak detector 38 and connected to the control signal generator 28 via the reference network 46, the hold network 42 receiving the reference signal from the reference network 46 generated or produced in response to a received control signal and being activated in response thereto. The hold network 42 essentially prevents further sampling of subsequently induced input signals until the various components and assemblies are reset via the reset network 34.

In summary, the indicator apparatus 10 develops a sample signal proportional to and indicative of the input signal and in response to a received, input signal induced therein via the transducer 12 when the integral of the input signal reaches a predetermined minimum level, the meter network 44 receiving the developed sample signal from a portion of the peak detector 38 and providing an operator-perceivable output indication indicative of the input signal in response to the received sample signal.

In one embodiment disclosed in detail in the applicant's copending application entitled "Apparatus for Providing Output Indications Responsive to the Movement of a Moving Body", Ser. No. 294,380, filed on Oct. 2, 1972, now U.S. Pat. No. 3,818,341, the transducer 12 includes a magnet 66, schematically shown in FIG. 1.

Referring more particularly to the control circuit of the indicator apparatus 10, shown in FIG. 1 and generally described before, a wire loop 72 is schematically represented as an electrical short connected across the input terminals 86 and 88 of the low pass filter network 20, the construction of the wire loop 72 and the control circuit connecting the induced input signal to the control circuit such that the polarity of the induced input signal voltage is positive at the terminal 88 and negative at the terminal 86, the wire loop 72 and the operation of the wire loop 72 to induce the input signal being described in detail in the Applicant's copending application entitled "Apparatus for Providing Output Indications Responsive to the Movement of a Moving Body", Ser. No. 294,380, filed on Oct. 2, 1972, now U.S. Pat. No. 3,818,341. The low pass filter network 20 includes a pair of resistors 90 and 92, the resistor 90 being connected to the input junction 86 and the resistor 92 being connected to the input junction 88. The resistor 90 is also connected to an output junction 94 and the resistor 92 is also connected to an output junction 96. The low pass filter network 20 also includes four capacitors 98, each capacitor 98 being connected to one of the junctions 86, 88, 94 and 96, the sides of the capacitors 98, opposite the sides connected to the junctions, being connected to a common ground. In one operational embodiment, the low pass filter network 20 and the various components thereof are constructed and sized to attenuate input signals thereto having a frequency exceeding approximately $10^4$Hz, the low pass filter network 20 passing input signals thereto having frequencies generally below approximately $10^4$Hz.

The output of the low pass filter network 20 at the output junctions 94 and 96 is connected to the junctions 100 and 102 of the active filter network 22. The active filter network 22 includes four impedance devices or, more particularly, four resistors 104, 106, 108 and 110 connected in a bridge network type of arrangement wherein the resistors 104 and 108 are each connected to the junctions 100, the resistors 106 and 110 are each connected to the junction 102, the resistors 104 and 106 are each connected to a junction 112, and the resistors 108 and 110 are each connected to a junction 114. The resistors 104 and 106 have substantially the same resistance value and the resistors 108 and 110 have substantially the same resistance value. The junctions 100 and 102 provide the common input junctions and output junctions of the active filter network 22 (the junctions being sometimes referred to below as the "input-output junctions 100 and 102"), the junction 112 being connected to the negative or inverting input of an operational amplifier 116, and the junction 114 being connected to the output of the operational amplifier 116. The positive or noninverting input of the operational amplifier 116 is connected via a conductor 118 to the bias control 36, which is constructed to provide a constant operating bias for the differential amplifier network comprising a portion of the amplifier network 24, in a manner to be described in greater detail below.

The active filter network 22 operates to maintain the sum of the voltage levels at the junctions 100 and 102 substantially constant or, in other words, to substantially maintain the sum of the voltages at a predetermined level controlled via the bias voltage input to the noninverting input of the operational amplifier 116 from the bias control 36, thereby effectively canceling or providing a relatively low impedance to common mode signals. The active filter network 22 provides a relatively high input impedance with respect to differential input signals connected to the input-output junctions 100 and 102, thereby essentially providing an open circuit with respect to input differential signals. The operational amplifier 116 operates to substantially maintain the inverting input at substantially the same voltage level as the noninverting input, the output of the operational amplifier 116 tending to maintain the common mode voltage at the input-output terminals 100 and 102 relatively constant.

Referring more particularly to the bias control 36, a negative power supply is connected to a terminal 124, the terminal 124 being connected to a silicon type of diode 126 and to the emitter of a germanium type transistor amplifier 122 via a resistor 128, the collector of the transistor amplifier 122 being connected to the control signal generator 28 via a conductor 130 and to the base of the transistor amplifier 120. A zener type of diode 132 is interposed in the conductor 130, generally between the connection between the collector of the transistor amplifier 122 and the base of the transistor amplifier 120 and the conductor 130. Thus, when a positive control signal is generated via the control signal generator 28, that positive control signal is applied to the base of the transistor amplifier 120 via the diode 132 which reduces the base-emitter voltage of the transistor amplifier 120 to substantially zero thereby switching the transistor amplifier 120 "off" or nonconducting. In this position of the transistor amplifier 120, the voltage on the conductor 118 is substantially zero thereby connecting a substantially zero common mode or bias voltage to the amplifier network 24 deactivating the amplifier network 24.

The emitter of the transistor amplifier 120 is connected to ground via a resistor 134 and a variable resistor 136, a pair of diodes 138 are connected between the resistor 134 and the variable resistor 136 and to the base of the transistor amplifier 120, generally between the transistor amplifier 120 and the connection of the base thereof to the collector of the transistor amplifier 122, as shown in FIG. 1. Thus, within defined limits, the variable resistor 136 adjustingly controls the level of the output voltage of the bias control 36 at the conductor 118, thereby controlling the voltage supplied to the operational amplifier 116 of the active filter network 22 and providing an adjustable bias voltage or signal control for the amplifier network 24 via the bias control 36.

The output of the active filter network 22 at the input-output junctions 100 and 102 is connected to the amplifier network 24 via a pair of conductors 140 and 142. More particularly, the conductor 140 is connected to the emitter of a transistor amplifier 144 and the conductor 142 is connected to the emitter of a transistor amplifier 146, the base of each of the transistor amplifiers 144 and 146 being connected to ground. The collector of each of the transistor amplifiers 144 and 146 is connected to a positive power supply at the terminal 148, the collector of the transistor amplifier 144 being connected at the terminal 148 via a resistor 150 and the collector of the transistor amplifier 146 being connected to the terminal 148 via a resistor 152.

The two transistor amplifiers 144 and 146 are thus connected to receive and amplify the active filter network 22 output signal and generally comprise an emitter coupled common base type of amplifier network, the bias control 36 being connected to the transistor amplifiers 144 and 146 providing the bias voltage therefor during the operation of the indicator apparatus 10 and in an activated position of the bias control 36. The signal amplified via the transistor amplifier 144 is connected to the positive input of an operational amplifier 154 via a conductor 156, connected generally between the collector of the transistor amplifier 144 and the resistor 150, and the signal amplified via the transistor amplifier 146 is connected to the negative input of the operational amplifier 154 via a conductor 158, connected between the collector of the transistor amplifier 146 and the resistor 152.

A resistor 160 is connected to ground and to the positive input of the operational amplifier 154 via the conductor 156, as shown in FIG. 1. The output signal of the operational amplifier 154 is connected to the peak detector 38 via a conductor 162, a feedback resistor 164 being connected between the operational amplifier 154 output signal on the conductor 162 and the negative input thereto. The transistor amplifiers 144 and 146 and the operational amplifier 154 are, more particularly, connected to comprise what may be referred to as an emitter coupled, common base differential type of amplifier network.

A capacitor 166 and a resistor 168 are interposed in the conductor 162, the capacitor 166 blocking the D-C component of the output signal of the operational amplifier 154. The conductor 162 is, more particularly, connected to a conductor 172 at a junction 174, the junction 174 being connected to the negative input of the operational amplifier 170. The positive input of the operational amplifier 170 is connected to ground, as shown in FIG. 1.

The output of the operational amplifier 170 in the peak detector 38 is connected to a junction 176, and an integrator capacitor 178 is connected between the operational amplifier 170 output signal at the junction 176 and the negative input to the operational amplifier 170 at the junction 174, the integrator capacitor 178 being connected to and cooperating with the operational amplifier 170 such that the operational amplifier 170 and the integrator capacitor 178 function in the nature of an integrating network during one portion of the operation of the indicator apparatus 10, as generally described before and in a manner to be described in greater detail below.

The peak detector 38 also includes a switch 180 connected to a positive power supply at a junction 182 and to the negative input of the operational amplifier 170 or, more particularly, to the junction 174, the switch 180 being more particularly of the type referred to in the art as a "MOS field-effect transistor switch" designed for enhancement-mode operation in relatively low power switching applications, for example. The integrator capacitor 178 is connected to the switch 180, generally between the switch 180 and the junction 174. The switch 180 is connected to a sample capacitor 184 at a junction 186, the side of the sample capacitor 184 opposite the side connected to the junction 186 being connected to ground. The junction 186 is connected to one side of the integrator capacitor 178 at a junction 188, generally between the integrator capacitor 178 and the output of the operational amplifier 170 or, in other words, generally between the integrator capacitor 178 and the junction 176. A diode 190 is interposed between the junction 186 and the junction 188, the cathode end of the diode being connected to the junction 186 thereby preventing the discharge of the sample capacitor 184 therethrough, for reasons which will be made more apparent below.

A sample resistor 192 is connected to the conductor 172 and to the negative input of the operational amplifier 170 at the junction 174, the sample resistor 192 also being connected to the output of the operational amplifier 170 at the junction 176 and a diode 194 being interposed between the resistor 192 and the junction 176. The sample resistor 192 is thus connected between the input and the output of the operational amplifier 170 at a pair of junctions 196 and 198, and is connected to the positive power supply 182 via the switch 180, as shown in FIG. 1. The junction 198 is connected to the meter network 44 via a conductor 200 and a resistor 202 is interposed in the conductor 200, generally between the junction 198 and the meter network 44. Thus, the meter network 44 is connected to the peak detector 38 to measure and provide an operator-perceivable output indication of the voltage drop across the sample resistor 192, the voltage drop across the sample resistor 192 being indicative of and proportional to the input signal.

During the operation of the indicator apparatus 10, the output signal from the operational amplifier 170 of the peak detector 38 at the junction 176 is initially at a first level which is "low", the output of the operational amplifier 170, in one operative embodiment, being a negative voltage value of $(-)0.7$ volts, for example. This initial "low" output signal of the operational amplifier 170 is primarily due to the continuous sampling of relatively low level "noise" during the resetting of the indicator apparatus 10, the sample capacitor 184 having some relatively low charge thereon. When the input signal is induced in the control circuit of the indicator apparatus 10 via the transducer 12 and amplified via the amplifier network 24, the amplified input signal is connected to the operational amplifier 170 causing the operational amplifier 170 output signal at the junction 176 to swing in a positive direction, the operational amplifier 170 and the capacitor 178 connected in parallel with the input and the output of the operational amplifier 170 functioning as an integrating network to integrate the input signal received via the operational amplifier 170. The positive swing integrated input signal at the output junction 176 of the operational amplifier 170 charges the integrator capacitor 178 and, when the voltage level of the integrated input signal at the junction 176 reaches a predetermined minimum level, the diode 190 is forward biased and the sample capacitor 184 begins to charge. The integrator capacitor 178 is, more particularly, sized to have a predetermined charging time; that is, a predetermined period of time is required to charge the integrator capacitor 178, for reasons and in a manner to be described in greater detail below with respect to the operation of the indicator apparatus 10.

The peak detector 38 is, more particularly, connected to the trigger signal generator 40 via a conductor 200, having a capacitor 202 and a resistor 204 interposed therein, the conductor 200 being more particularly connected to the junction 188 and to the negative input of an operational amplifier 206. The positive input to the operational amplifier 206 is connected to ground, and the output signal of the operational amplifier 206 is connected to a junction 208 via a resistor 210. A feedback loop is connected between the output of the operational amplifier 206 and the negative input to the operational amplifier 206, the feedback loop comprising a feedback resistor 212 and a diode 214, the diode 214 being connected in parallel with the feedback resistor 212.

The junction 208, connected to the output of the operational amplifier 206, is connected to the junction 176 of the peak detector 38 via a diode 216, the common connection between the junction 176 and the diode 216 being connected to the collector of a transistor amplifier 218 in the hold network 42. The junction 208, generally between the diode 216 and the resistor 210, is also connected to the control signal generator 28 via a conductor 220, a diode 222 being interposed in the conductor 220.

The operational amplifier 206 is thus connected to the various components of the trigger signal generator 40 to operate and function in the nature of a logarithmic differentiator, the differentiator network receiving the integrated input signal from the peak detector 38 via the connection between the inverting input of the operational amplifier 206 and the junction 188 of the peak detector 38 and producing an output signal responsive to the negative value of the rate-of-change of the integrated input signal with respect to time. The diode 222 is sized to be forward biased conducting the trigger signal generator 40 output signal or, more particularly, the trigger signal to the control signal generator 28 at a predetermined "high" level of the differentiator output signal connected to the junction 208 and the diode 216 is sized to not clamp the differentiator output signal at the junction 208 at a predetermined "high" level of the integrated input signal at the junction 176. Thus, the diodes 216 and 222 and the resistor 210 comprise what may generally be referred to as a "logical AND circuit" constructed such that the signal at the junction 176 of the peak detector 38 and the signal at the junction 208 of the trigger signal generator 40 must each be at a predetermined "high" level before the trigger signal is generated and produced by the trigger signal generator 40 and connected to the control signal generator 28 via the diode 222. The produced and generated trigger signal of the trigger signal generator 40 is thus indicative of the development of the sample signal in the peak detector 38, in a manner and for reasons to be made more apparent below.

The control signal generator 28 basically comprises a pair of transistor amplifiers 224 and 226, schematically shown in FIG. 1. The trigger signal from the trigger signal generator 40 is connected to the base of the transistor amplifier 224 via the conductor 220 and the diode 222 in a forward biased position of the diode 222, the base of the transistor amplifier 224, generally between the diode 222 and the transistor amplifier 224, being connected to the collector of the transistor amplifier 226 via resistor 228, and the base of the transistor amplifier 226 being connected to the collector of the transistor amplifier 224 via a resistor 230. The emitter of the transistor amplifier 224 is connected to ground, and the collector of the transistor amplifier 224 is connected to a positive power supply at a terminal 232 via a resistor 234, the resistor 234 being interposed between the connection between the base of the transistor amplifier 226 to the collector of the transistor amplifier 224 and the positive power supply connected at the terminal 232. The transistor amplifiers 224 and 226 are thus interconnected to comprise what is commonly referred to in the art as a "flip-flop" circuit wherein the transistor amplifier 226 is initially biased in the conducting or "on" position and the transistor amplifier 224 is initially biased in the nonconducting or "off" position, the status of the transistor amplifiers 224 and 226 being reversed in response to a received trigger signal from the trigger signal generator 40, the control signal generator 28 thus producing the control signal in response to a received, positive trigger signal, as mentioned before and for reasons which will be made more apparent below.

The peak detector 38 is connected to the reset network 34 and, more particularly, the junction 186 between the capacitor 184 and the switch 180 is connected to a switch 235, the switch 235 being, more particularly, a field effect type of transistor (FET) and the junction 186 being, more particularly, connected to the source connection of the switch 235 via a diode 236 and a resistor 238. The drain side of the switch 235 is connected to ground, as shown in FIG. 1. The gate of the switch 235 is connected to a junction 240 via a resistor 242.

The reset network 34 includes a pair of electrical power supplies 244 and 246, the negative side of the power supply 244 being connected to the positive side of the power supply 246 and the common connection therebetween being connected to ground, as shown in FIG. 1. The power supply 244 is connected to a switch position 248 and the power supply 246 is connected to a switch position 250, the switch positions 248 and 250 constituting the reset and on switch positions of a double-pole, single throw switch 252 having a pair of mechanically connected switch arms 254, as shown in FIG. 1. The switch 252 also includes a pair of "off" switch positions, each designated by the reference numeral 255 in FIG. 1.

One of the switch arms 254 of the switch 252 is connected to the terminal 240 via a capacitor 256, the connection between the switch arm 254 and the capacitor 256 being connected to the positive buss for the indicator apparatus 10 at a terminal 258 and the other switch arm 254 of the switch 252 being connected to the terminal 240 via a resistor 260 and a diode 262 connected in parallel and to the negative buss for the indicator apparatus 10 at a terminal 263. In the "off" position of the switch 252, the switch arms 254 are each positioned to interrupt the electrical continuity between the electrical power supplies 244 and 246 and the components and assemblies of the indicator apparatus 10 connected thereto and, in the reset or on position of the switch arms 254, electrical continuity is established between the electrical power supplies 244 and 246 and the various components and assemblies of the indicator apparatus 10, in a manner to be described in greater detail below.

The source side of the switch 235 is connected to a germanium type of transistor amplifier 264 in the reference network 46 via a resistor 268, the source side of the switch 235 being more particularly connected to the emitter of the transistor amplifier 264. The emitter of the transistor amplifier 264 is connected to a positive power supply at a terminal 270 via a resistor 272, and a silicon diode 274 is connected between the resistor 272 and the positive power supply 270 and to the base of the transistor amplifier 264.

The base of the transistor amplifier 264, generally between the transistor amplifier 264 and the diode 274 is connected to the collector of a transistor amplifier 276. The base of the transistor amplifier 276 is connected to the collector of the transistor amplifier 226 in the control signal generator 28 and the collector of the transistor amplifier 264 is connected to the collector of the transistor amplifier 226 in the control signal generator 28. The emitter of the transistor amplifier 276 in the reference network 46 is connected to a junction 277 via a conductor 280, the junction 277 being connected to ground and to the emitter of the transistor amplifier 226 of the control signal generator 28. A resistor 278 is interposed in the conductor 280, and a zener type of diode 282 is connected between the base of the transistor amplifier 276 of the reference network 46 and the conductor 280, generally between the resistor 278 and the transistor amplifier 226 of the control signal network 28. The reference network 46 is constructed to receive a control signal from the control signal generator 28 via the connection between the transistor amplifier 226 of the control signal generator 28 and the transistor amplifiers 264 and 276 in the reference network 46, in one aspect of the operation of the indicator apparatus 10, the reference network 46 being constructed to develop a predetermined voltage reference signal in response to a received control signal which is connected to the meter network 44, for reasons and in a manner to be described in greater detail below.

The emitter of the transistor amplifier 276 in the reference network 46 is also connected to a junction 284 and the junction 284 is connected to the base of a transistor amplifier 286 via a resistor 288, the transistor amplifier 286 comprising a portion of the sample indicator 32, as shown in FIG. 1. The emitter of the transistor amplifier 286 is connected to ground, and the collector of the transistor amplifier 286 is connected to a positive power supply at a junction 290, a resistor 292 being interposed between the collector of the transistor amplifier 286 and the junction 290. The collector of the transistor amplifier 286 is connected to the conductor 314 via a conductor 294, the conductor 294 being connected generally between the resistor 292 and the collector of the transistor amplifier 286. A zener type of diode 296 is interposed in the conductor 314, the anode end of the diode 296 being connected to ground and the cathode end of the diode 296 being connected to the junction or connection between the conductor 294 and the conductor 314. The sample indicator 32 cooperates with the meter network 44 to provide an operator-perceivable output indication indicating that the sample voltage has been developed in the peak detector 38, in a manner to be made more apparent below.

The hold network 42 includes the transistor amplifier 218, as mentioned before, and the base of the transistor amplifier 218 is connected to the junction 284 via a conductor 298, and a resistor 300 is interposed in the conductor 298 generally between the transistor amplifier 218 and the junction 284. The collector of the transistor amplifier 218 of the hold network 42 is connected to the junction 176 of the peak detector 38 via a conductor 302, generally between the junction 176 and the diode 216 of the trigger signal generator 40. The emitter of the transistor amplifier 218 in the hold network 42 is connected to the junctions 174 and 196 of the peak detector 38 via a conductor 304, a diode 306 being interposed in the conductor 304, generally between the transistor amplifier 218 of the hold network 42 and the junction 196 of the peak detector 38. A diode 305 is connected to the emitter of the transistor amplifier 218, generally between the transistor amplifier 218 and the diode 306, the diode 305 connecting the junction 176 of the peak detector 38 to ground in an "on" or conducting position of the transistor amplifier 218 to swing the output signal of the operational amplifier 170 in the negative-going direction lowering the voltage level at the junction 176, reverse-biasing the diode 190, thereby preventing further charging of the sample capacitor 184 and cooperatingly preventing the further sampling of subsequent input signals via the peak detector 38 until the indicator apparatus 10 has been reset. The transistor amplifier 218 also functions to drive the junction 174 of the peak detector 38 positive in the conducting or "on" position of the transistor amplifier 218 which further swings the operational amplifier 170 output signal at the junction 176 in the negative direction.

The meter network 44 includes an operational amplifier 308 having the output thereof connected to a meter 310, the meter 310 being more particularly constructed and connected to the components of the meter network 44 to comprise what is commonly referred to in the art as a "null type meter", as generally mentioned before. The meter 310 is also connected to ground via a resistor 312, as shown in FIG. 1.

The positive input of the operational amplifier 308 is connected to the collector of the transistor amplifier 286 via a conductor 314, the conductor 314 being, more particularly, connected at the junction or connection between the conductor 294 and the cathode end of the diode 296. A capacitor 316 is interposed in the conductor 314 and a resistor 318 is connected to one side of the capacitor 316, the resistor 318 being then connected to ground. A pair of diodes 320 and 322 connected in parallel are interposed between the capacitor 316 and the operational amplifier 308, as shown in FIG. 1. A resistor 324 is connected to the positive input of the operational amplifier 308, generally between the operational amplifier 308 and the diodes 320 and 322, the resistor 324 being connected to ground.

The negative input of the operational amplifier 308 is connected to the junction 284 via a conductor 326 and a variable resistor 328 is interposed in the conductor 326, generally between the operational amplifier 308 and the junction 284. A feedback resistor 330 is connected between the negative input of the operational amplifier 308 and the output thereof, the conductor 200, connecting the junction 198 of the peak detector 38 to the meter network 44, being more particularly connected between the feedback resistor 330 and the negative input of the operational amplifier 308. The cathode end of a diode 332 is connected to the junction between the feedback resistor 330 and the conductor 200, the anode end of the diode 332 being connected to ground.

As mentioned before, the meter 310 is, more particularly, a null type of meter and includes a meter needle, in one preferred form. The meter 310 receives the operational amplifier 308 output signal and the meter needle 334 moving in one direction or in the opposite direction provides one form of operator-perceivable output indication. The nulling of the meter 310 to position the meter needle at a substantially zero or null position by varying the adjustable resistor 328 to balance the sample signal and the voltage reference signal to a position wherein the operational amplifier 308 output signal nulls the meter needle provides the operator-perceivable output indication indicative of the input signal.

Operation of FIG. 1

The indicator apparatus 10, shown in FIG. 1, is constructed to provide an operator-perceivable output indication indicative thereof. For the purpose of clarity of description, the current through the integrator capacitor 178 is diagrammatically shown in FIG. 1 and designated by the reference numeral 338, the current through the switch 180 is diagrammatically shown in FIG. 1 and designated by the reference numeral 340, and a current being drawn generally from the junction 174 is diagrammatically shown in FIG. 1 and designated by the reference numeral 342, the currents 338, 340 and 342 being referred to below with reference to the operation of indicator apparatus 10.

When the indicator apparatus 10 is initially positioned in the "off" position via moving the switch arms 254 to the "off" switch positions 255, the capacitor 256 connected to and discharged through the positive buss at the terminal 258, the various components and assemblies of the indicator apparatus 10, through the negative buss at the terminal 263, through the diode 262 and resistor 260 to the junction 240. Except for the voltages of the power supply of the indicator apparatus 10 provided via the power supplies 244 and 246, the voltage levels within the control circuit of the indicator apparatus 10 will drop to zero within a relatively short time after the switch 252 is positioned in the "off" position. But for the diode 262, the operator would be required to maintain the switch 252 in the "off" position for a period of time controlled essentially via the time-constant of the capacitor 256 and the resistor 260 before again positioning the switch 252 in the "on" position during the reset operation of the indicator apparatus 10, as will be made more apparent below.

When the switch 252 is initially positioned in the "on" or "reset" position via moving the switch arms 254 to the switch positions 248 and 250, the capacitor 256 of the reset network 34 is charged via the resistor 242 and the field-effect transistor or switch 235, the capacitor 256 also being charged via the resistor 260. The capacitor 184 is discharged via the switch 235 to the ground connection at the drain side of the switch 235. The positive power supply at the terminal 270 is connected to ground via the switch 235 causing an increased current flow across the resistor 272 biasing the transistor amplifier 264 of the reference network 46 in the off or non-conducting position, the transistor 276 being biased in the off or non-conducting position and the reference voltage at the junction 284 being substantially zero. The transistor amplifier 224 of the control signal generator 28 is biased in the off or non-conducting position and the transistor amplifier 226 of the control signal generator 28 is biased in the on or conducting position connecting a relatively small positive voltage to the diode 132 of the bias control 36 via the conductor 130, the positive voltage connected to the diode 132 being of an insufficient voltage level to bias the diode 132 in the conducting or closed position, in this position of the indicator apparatus 10.

After the switch 252 is positioned in the "on" or "reset" position, the control circuit of the indicator apparatus 10, shown in FIG. 1, is positioned in the operating position for receiving input signals induced therein via the transducer 12. In this position of the indicator apparatus 10, the capacitor 256 is fully charged and a negative voltage is applied to the gate of the switch 235 opening or positioning the switch 235 in an off position, the diode 236 between the switch 235 and the junction 186 of the peak detector 38 being reversed biased and positioned in the open position. The transistor amplifiers 120 and 122 of the bias control 36 are each biased in the on or conducting position connecting the operating bias voltage to the transistor amplifiers 144 and 146 of the amplifier network 24 via the active filter network 22, the output voltage level of the bias control 36 controlling and setting the common mode voltage level biasing the transistor amplifiers 144 and 146 in the on or conducting position.

Further, after the indicator apparatus 10 is positioned in the "on" or "reset" position, the junction 208 is clamped to substantially ground potential via the diode 216 and a relatively small noise current 340 is conducted through the switch 180 of the peak detector 38 holding the output of the operational amplifier 170 at the junction 176 at the initial or first level, which is approximately a negative 0.7 volts in the one operational embodiment, mentioned generally before. The base of the transistor amplifier 218 of the hold network 42 is clamped to substantially ground potential via the negative voltage at the junction 176 of the peak detector 38, the diodes 305 and 306 each being biased in the open or non-conducting position.

In summary, the indicator apparatus 10 is positioned in the reset or on position via positioning the switch arms 254 in the switch positions 248 and 250, thereby discharging the capacitor 184 and positioning the control circuit such that: the amplifier network 24 is biased in the operation position by the bias control 36 connected thereto via the active filter network 22; the diode 236 is reverse biased or open; the control signal generator 28 is held in the reset or on position wherein the transistor amplifier 224 is biased in the off or non-conducting position and the transistor amplifier 226 is biased in the on or conducting position; the peak detector 38 having sampled during the transient period of reset relatively low level noise signals in the input circuit of the indicator apparatus 10 by charging the capacitor 184, the current 340 representing or indicating the sampled noise current; the sampled noise current causes a voltage drop at the diode 194 establishing the initial, first level of voltage at the junction 176; and the capacitor 256 of the reset network 34 is fully charged and the switch 235 is positioned in th open position. In this position, the indicator apparatus 10 is positioned to receive, sample and display induced input signals. The induced input signal from the transducer 12 is connected to the control circuit of the indicator apparatus 10 at the input junctions 86 and 88, the input signal being connected to the amplifier network 24 via the low pass filter network 20 and the active filter network 22, as described before. The input signal is amplified via the amplifier network 24 and connected to the peak detector 38 via the conductor 162.

The amplifier network 24 output signal is, more particularly, connected to the junction 174 of the peak detector 38 and to the negative input of the operational amplifier 170 of the peak detector 38. The operational amplifier 170 inverts the amplifier network 24 output signal, thereby swinging the output of the operational amplifier 170 at the junction 176 in a positive-going direction, the operational amplifier 170 and the integrator capacitor 178 integrating the operational amplifier 154 output signal.

As previously mentioned, the peak detector 38 receives and integrates some relatively low amplitude noise signals prior to sampling and the noise signals appear at the junction 176 of the delay and sample network 26 establishing the first, initial predetermined voltage level of the delay and sample network 26, the initial predetermined voltage level being of an insufficient value to activate trigger signal generator 40. The amplified, induced input signal of the indicator apparatus 10 is integrated via the delay and sample network 26 and the integrated input signal appears at the junction 176 of peak detector 38 raising the voltage level generally from the initial predetermined level toward the second predetermined level sufficient to activate the trigger signal generator 40, as will be described in greater detail below.

Thus, when the indicator apparatus 10 initially starts receiving the induced input signals, the input signal and the noise signal (sometimes referred to herein as the "first signal") are each integrated via the peak detector 38 and the integrated signal appears at the junction 176, the integration of the signals being generally expressed algebraically as follows for the purpose of clarity of description:

$$\int (I_{342} - I_{340})dt \qquad (1)$$

wherein:

$I_{340}$ = represents the value of current through the switch 180, the current being more particularly produced by the noise signal, in this instance;

$I_{342}$ = represents the value of the current drawn generally from the junction 174 as a result of the induced input signal.

In this position of the indicator apparatus 10 initially receiving an induced input signal, the voltage across the sample resistor 192 (between the junctions 196 and 198) is substantially zero, the capacitor 178 of the peak detector 38 is being charged via the current 338 and the capacitor 202 connected to the negative input of the operational amplifier 206 is being charged. If the input signal is not of a sufficient strength for a predetermined duration to shift the integrated input signal at the junction 176 to the predetermined minimum value, the indicator apparatus 10 will not be positioned in a sampled position, the diode 222 connected to the control signal generator 28 remaining in a reversed bias position.

Assuming the induced input signal is of a sufficient strength to raise or shift the voltage level at the junction 176 from the initial predetermined level to the predetermined minimum level to cause the indicator apparatus 10 to be positioned in the sampled position, the induced input signal amplified via the amplifier network 24 is integrated via the peak detector 38, the integrated input signal appearing at the junction 176 in a manner similar to that described before. The output signal of the operational amplifier 170 thus swings in the positive-going direction and the capacitors 178 and 202 each begin charging. As the voltage level at the junction 176 continues to rise, the capacitor 178 continues to charge and the sample capacitor 184 will begin to charge (in most instances) when the voltage level at the junction 176 is of a sufficient level to forward bias the diode 190, the charging of the sample capacitor 184 biasing the switch 180 in the closed or conducting position increasing the current 340. Also, as the integrated input signal continues to swing the voltage level at the junction 176 in the positive-going direction, the current through the switch 180 will continue to increase as the charge on the sample capacitor 184 is increased, and the current through the integrator capacitor 178 will generally decrease as the voltage level at the junction 176 approaches the predetermined minimum level for positioning the indicator apparatus 10 in the sampled position.

The peak detector 38 is constructed such that, when the current represented by the directional arrow 340 is substantially equal to the current being drawn from the peak detector 38 represented by the directional arrow 342, the slope of the integrated input signal at the junction 176 is substantially zero since the current 338 is equal to the capacitance of the integrator capacitor 178 multiplied by the rate-of-change of the voltage level at the junction 176 with respect to time and, if the rate-of-change of the voltage level at the junction 176 is substantially equal to zero, then the current 338 is substantially equal to zero. In this position of the delay and sample network 26, the voltage level at the junction 176 is at the predetermined minimum voltage level (the second predetermined level) sufficient to cause the generation of the trigger signal and the control signal for positioning the indicator apparatus 10 in the sampled position.

The trigger signal generator 40 receives the signal at the junction 176 or, more particularly, at the junction 188, and is constructed to switch output state thereof when the slope of the signal at the junction 176 and 188 is substantially zero or, in other words, when the peak detector 38 voltage level of the output signal at the junctions 176 and 178 has switched from the first, initial predetermined level to the second, predetermined minimum level. In response to the received output signal from the peak detector 38 of the predetermined minimum level, the output signal of the operational amplifier 206 at the junction 208 switches to the "high" state or, in other words, the trigger signal generator 40 generates and produces the output trigger signal. The trigger signal is connected to the base of the transistor amplifier 224 and to the collector of the transistor amplified 226 via the resistor 228, thereby biasing the control signal generator 28 to a position wherein the transistor amplifier 224 is biasingly switched to the "on" or conducting position and the transistor amplifier 226 is in the "off" or non-conducting position, the control signal generator 28 remaining in this position until the indicator apparatus 10 is reset via the reset network 34 in a manner described before.

Immediately prior to the generation of the trigger signal via the trigger signal generator 40, the transistor amplifier 276 is biased in the "off" or non-conducting position and the voltage level at the junction 284 of the reference network 46 is substantially zero, the transistor amplifier 218 of the hold network 42 being biased in the "off" or non-conducting position. After the trigger signal has been generated via the trigger signal generator 40, the transistor amplifiers 264 and 276 are each biased in the "on" or conducting position thereby developing and producing a predetermined reference voltage level at the junction 284 of the reference network 46. The reference voltage at the junction 284 is connected to the base of the transistor amplifier 218 of the hold network 42 biasing the transistor amplifier 218 in the "on" or conducting state.

The transistor amplifier 286 of the sample network 32 is biased in the "on" or conducting position, discharging the capacitor 316, previously charged via the connection thereof to the positive power supply at the terminal 290. The discharging of the capacitor 316 causes a signal input at the positive or noninverting input of the operational amplifier 308 thereby causing the meter needle 334 to be moved indicating that the sample signal has been developed in the peak detector 38, the capacitor 316 being subsequently recharged.

When the trigger signal is generated via the trigger signal generator 40 and the control signal is generated via the control signal generator 28, the transistor amplifier 218 of the hold network 42 is thus biased in the "on" or conducting position connecting the operational amplifier 170 output signal at the junction 176 to ground via the diode 305 and conducting a positive signal to the input of the operational amplifier 170 at the junction 174 causing the output signal of the operational amplifier 170 at the junction 176 to further swing in the negative-going direction. Since the negative-going swing at the junction 176 occurs immediately after the slope of the signal at the junction 176 goes to substantially zero, the sample capacitor 184 is thus substantially blocked from further charging, the diode 190 being reverse biased or open. The negative-going swing at the junction 176 is continued until the current through the resistor 300 goes through the collector of the transistor amplifier 218 in the nature of a forward biased diode, the current through the diodes 305 and 306 of the hold network 42 going to substantially zero. The amplifier network 24 is biased in the "off" position via the bias control 36 and the current 342 goes to substantially zero, the current 338 being substantially zero during this stage of the operation of the indicator apparatus 10, after a transient period of time. Thus, the current 340 will go through the sample resistor 192 developing a voltage drop thereacross equal to the developed sample signal. In this position of the indicator apparatus 10 should the voltage level at the junction 176 tend to move in the positive-going direction charging the sample capacitor 184, the hold network 42 acts to draw current from the junction 176 and conduct the positive hold or blocking signal to the junction 174 at the negative or inverting input of the operational amplifier 170, thereby lowering the voltage level at the junction 176 and effectively clamping the junction 176 at a voltage level sufficiently low to substantially prevent further charging of the sample capacitor 184. The transistor amplifier 218 thus provides a clamping action blocking the receiving and sampling of subsequently induced input signals via the peak detector 38. Thus, after the transient period of time, the current 338 through the integrator capacitor 178 is substantially zero and the sample capacitor 184 remains charged continuing to bias the switch 180 closed to produce the current 340 for developing the sample signal across the sample resistor 192.

The sample signal across the resistor 192 is connected to the meter network 44 and the adjusting of the variable resistor 328 to null the meter 310 provides the output indication indicative of the input signal. The indicator apparatus 10 provides an operator-perceivable output indication via the meter 310 indicating that the trigger signal and the control signal have been generated to initiate the positioning of the indicator apparatus 10 in the sampled position via the discharging of the capacitor 316 to cause the meter needle 334 to swing to the left of the null position.

After the meter network 44 has been adjusted to provide the output indication indicative of the input signal, the operator can re-position or reset the indicator apparatus 10 for receiving and sampling additional, subsequently induced input signals via the reset network 34. The switch 252 is first moved to the "off" position by moving the switch arms 254 to the off switch positions 255. The opening of the switch arms 254 discharges the capacitor 256 through the positive buss at the terminal 258, the various components of the control circuit of the indicator apparatus 10, and the diode 262 to ground. The indicator apparatus 10 is then turned on via moving the switch arms 254 to the on or reset switch positions 248 and 250, thereby positioning the switch 254 in the on or conducting position and discharging the sample capacitor 184 through the switch 235. The positioning of the switch 235 in the conducting position pulls the potential at the emitter of the transistor amplifier 264 down, thereby reverse biasing the transistor amplifier 264 causing the control signal generator 28 to be reset to a position wherein the transistor amplifier 226 is conducting and the transistor amplifier 224 is non-conducting. The capacitor 316 is charged to provide the operator-perceivable output indication indicating the indicator apparatus 10 has been reset for receiving subsequently induced input signals in a manner described before.

Embodiment of FIG. 2

Figure 4:
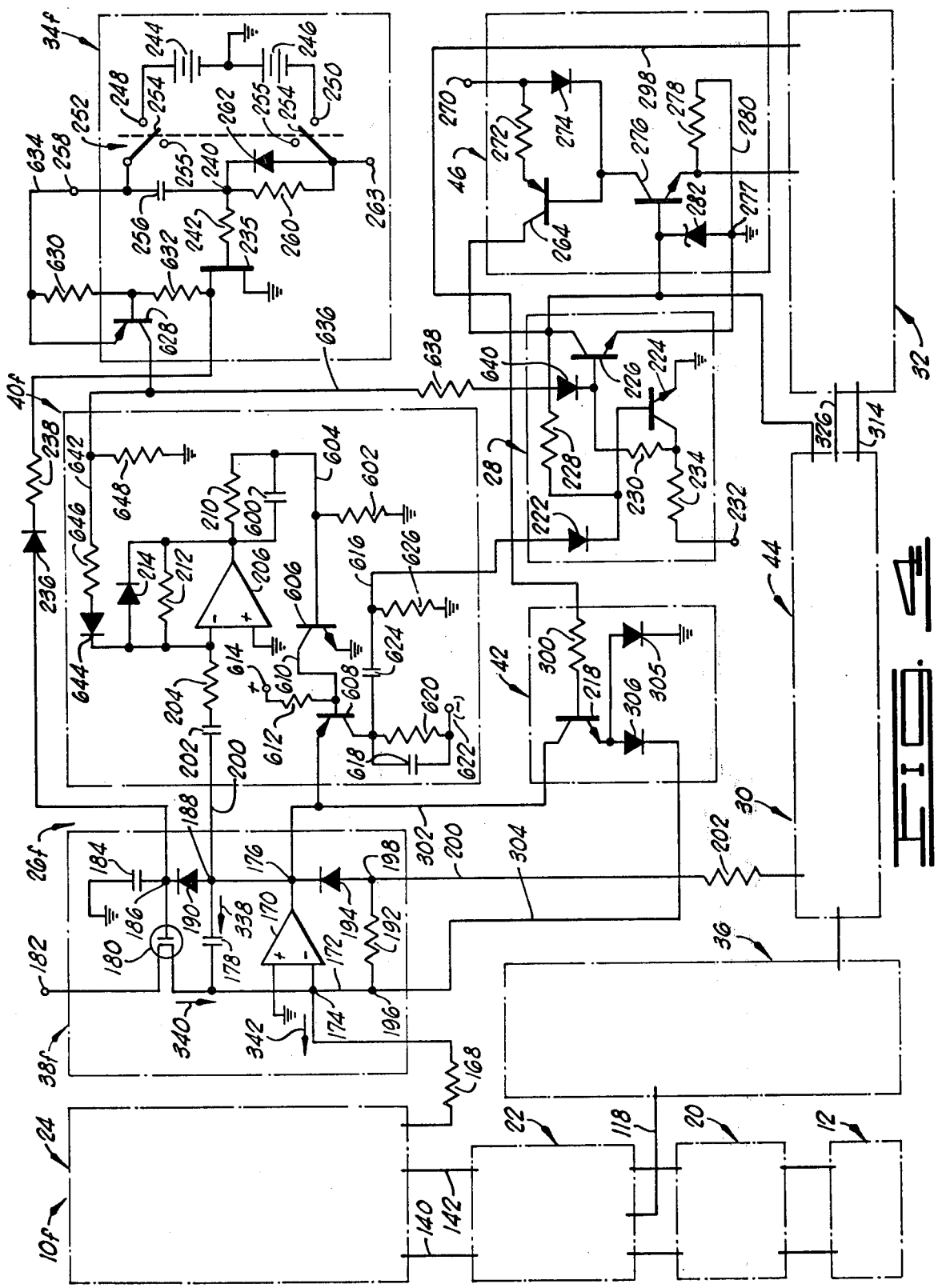
FIG. 4 is a partial, schematic view showing a portion of a modified indicator apparatus.

Shown in FIG. 2 is a modified transducer 12a having a modified signal transducer 16a, a modified low pass filter network 20a and a modified meter network 44a, which can be incorporated in part or in whole in the indicator apparatus 10 of FIG. 1, described before, only those portions of the indicator apparatus 10 necessary to explain the modified portions have been shown in FIG. 4 for the purpose of clarity of description. The modified transducer 12a, move particularly, includes a modified magnet 66a, the modified magnet 66a being more particularly the meter 310a magnet utilized to deflect the meter needle, the meter 310a magnet being thus utilized to deflect the meter needle and simultaneously being utilized to produce the magnetic field for the transducer 12a, which may be more desirable and economical in some applications.

As shown in FIG. 2, a compensating coil 410 and a compensating coil 412 are connected between the transducer 12a and the low pass filter network 20a, as schematically shown in FIG. 2. In practice, the coil 410 is more particularly connected to one side of the loop 72 and the other coil 412 is more particularly connected to the opposite side of the loop 72 such that each compensating coil 410 and 412 receives and induces signals in the transducer 12 in a direction generally electrically opposed to the signals induced in the loop 72. In this manner, low amplitude noise or extraneous noise signals induced in the loop 72 are also induced in the compensating coils 410 and 412 and canceled thereby, the compensating coils 410 and 412 thus providing additional, augmenting apparatus for reducing the introduction of noise and extraneous signals into the control circuit of the indicator apparatus 10 via the transducer 12a.

In lieu of the resistors 90 and 92, as shown schematically in FIG. 1, the modified low pass filter network 20a includes a core assembly 400 having a core 402. The core 402 receives the pair of signal carrying conductors, each conductor being indentically wound in one direction about the core 402 and electrically connected such that the junctions 86 and 88 are connected to similar ends and the junctions 94 and 96 are connected to the other pair of similar ends. The core 402 and the wound conductor portions 404 and 406 constitute what is referred to in the art as a bifilar wound torroidal ferrite core, the core assembly 400 having a relatively high impedance with respect to common mode signals received thereby and a relatively low impedance with respect to differential signals received thereby.

Embodiment of FIG. 3

Shown in FIG. 3 is a portion of a modified meter network 44b, the meter netrowk 44b being constructed similar to the meter network 44 described in detail before, the salient difference being that the meter network 44b includes an additional feedback network 420 connected in parallel with the feedback resistor 330. The feedback network 420 includes a switch 422 connected in series with a resistor 424 and a pair of diodes 426 and 428, the diodes 426 and 428 being connected in parallel and reversed oriented. The switch 422 allows the additional feedback network 420 to be switched into the meter network 44b for decreasing the sensitivity except at the null position of the meter 310 connected to the output of the operational amplifier 308, which may be desirable in some applications.

Embodiment of FIG. 4

Shown in FIG. 4 is a partial, schematic view of a modified indicator apparatus 10f constructed similar to the indicator apparatus 10 described before and schematically shown in FIG. 1, only those portions of the control circuit of the indicator apparatus 10f considered necessary to illustrate the differences shown in FIG. 4 for the purpose of clarity of description. The indicator apparatus 10f includes a modified delay and sample network 26f and a modified reset network 34f.

The delay and sample network 26f includes a modified peak detector 38f and a modified trigger signal generator 40f. The trigger signal generator 40f includes a capacitor 600 connected in parallel with the resistor 210 and a resistor 602 connected to a conductor 604 and to ground, the conductor 604 being connected to the output signal of the operational amplifier 206 via the resistor 210 and the capacitor 600.

The output signal of the operational amplifier 206 is, more particularly, connected to the base of a transistor amplifier 606. The emitter of the transistor amplifier 606 is connected to ground and the collector of the transistor amplifier 606 is connected to the base of a transistor amplifier 608 via a conductor 610. A resistor 612 is connected to the conductor 610 and to a terminal 614 connected to the positive power supply of the indicator apparatus 10f. The emitter of the transistor amplifier 608 is connected to the junction 176 of the peak detector 38f via the conductor 302. The collector of the transistor amplifier 608 is connected to the diode 222 via a conductor 616, the collector being more particularly connected to the control signal generator 28 via the conductor 616 and the diode 222.

A capacitor 618 connected in parallel with a resistor 620 is connected to the collector of the transistor amplifier 608 and to a terminal 622 connected to the negative power supply of the indicator apparatus 10f. A capacitor 624 is interposed in the conductor 616 between the capacitor 624 and the diode 222 and to ground, as shown in FIG. 4.

The modified reset network 34f includes a transistor amplifier 628, the base of the transistor amplifier 628 being connected between a pair of resistors 630 and 632. The resistor 630 is connected to the positive power supply at the terminal 258 via a conductor 634 and the resistor 632 is connected to the source side of the switch 235 between the diode 236, the resistor 238 and the switch 235.

The emitter of the transistor amplifier 628 is connected to the positive power supply at the terminal 258, the emitter being connected to the connection of the conductor 634 to the resistor 630. The collector of the transistor amplifier 628 is connected to the base of the transistor amplifier 226 of the control signal generator 28 via a conductor 636, a resistor 638 and a diode 640 being interposed in the conductor 636. The collector of the transistor amplifier 628 is also connected to the feedback network of the trigger signal generator 40f via a conductor 642, the conductor 642 being connected at the connection between the conductor 636 and the collector of the transistor amplifier 628 and at the connection between the diode 214, the resistor 212 and the inverting input of the operational amplifier 206, as shown in FIG. 4. A diode 644 and a resistor 646 are interposed in the conductor 642 and a resistor 648 is connected to the conductor 642 between the diode 644, the resistor 648 and the connection of the conductor 636 to the collector of the transistor amplifier 628, the resistor 648 also being connected to ground.

In summary, the transistor amplifier 628, the resistors 630, 632, 638, 646 and 648, the conductors 634, 636 and 642, and the diodes 640 and 644 comprise the modified portion of the reset network 34f, the resistor 268 connecting the switch 235 to the transistor amplifier 264 of the reference network 46 of the indicator apparatus 10, shown in FIG. 1, being eliminated in the indicator apparatus 10f, shown in FIG. 6. The connection between the operational amplifier 206 and the junction 176 of the peak detector 38 and between the operational amplifier 206 and the control signal generator 28 of the indicator apparatus 10, shown in FIG. 1, are replaced via the transistor amplifiers 606 and 608 and the various components connected generally thereto, as shown in FIG. 4.

The indicator apparatus 10f will operate similar to the indicator apparatus 10, described before. When the indicator apparatus 10f is initially switched to the "on"

or reset position by moving the switch arms 254 to the "on" switch positions 248 and 250, the sample capacitor 184 is discharged to ground via the switch 235, in a manner like that described before with respect to the indicator apparatus 10. The transistor amplifier 628 biased in the on or conducting position, thereby biasing the transistor amplifier 226 in the "on" or conducting position resetting the control signal generator 28, for reasons described before with respect to the indicator apparatus 10. The output signal of the operational amaplifier 206 is "low" and the transistor amplifiers 606 and 608 are each biased in the "off" or non-conducting position.

After the indicator apparatus 10f has been reset or at the end of the reset portion of the operation of the indicator apparatus 10f, the switch 235 and the transistor amplifier 628 are each biased in the "off" or non-conducting position and the diodes 236, 644 and 640 are each reverse biased or open, the transistor amplifier 226 being biased in the "on" or conducting position by the positive power supply connected thereto via the terminal 232 and the resistors 234 and 230 and to ground via the connection of the emitter of the transistor amplifier 226 to ground.

When an input signal is induced in the control circuit of the indicator apparatus 10f via the transducer 12 and initially received by the delay and sample network 26f, the peak detector 38f will begin integrating the received amplifier network 24 output signal, the integrated signal swinging the voltage level at the junction 176 in a positive-going direction. Initially, the integrated signal at the junction 176 connected to the inverting input of the operational amplifier 206 is not of a sufficient level to switch the state of the operational amplifier 206 of the trigger signal generator 40f from a "low" to a "high" state for generating the trigger signal. Thus, the transistor amplifiers 606 and 608 are each biased in the "off" or non-conducting position, and the transistor amplifier 218 of the hold network 42 is also biased in the "off" or non-conducting position.

As the voltage level at the junction 176 of the peak detector 38f continues to swing in the positive-going direction to a level less than the second predetermined level, the operational amplifier 206 output signal will be positive biasing the transistor amplifier 606 in the "on" or conducting position. However, assuming the voltage level at the junction 176 does not rise to the second predetermined level activating the control circuit of the indicator apparatus 10f to sample the induced input signal, the transistor amplifier 608 will remain biased in the "off" or non-conducting position.

When the integrated signal at the junction 176 of the peak detector 38f initially reaches the second predetermined level, the transistor amplifiers 606 and 608 are each biased in the "on" or conducting position, the PNP type of transistor amplifier 608 being connected to the junction 176 and operating relatively rapidly to pull the voltage level at the junction 176 in a negative-going direction. In the "on" or conducting position of the transistor amplifier 608, current is generally conducted through the transistor amplifier 608, through the conductor 616 and to ground via the emitter of the transistor amplifier 224 of the control signal generator 28 biasing the transistor amplifier 224 in the "on" or conducting position.

The clamping of the junction 176 via the transistor amplifier 608 in a relatively rapid manner causes the inverting input of the operational amplifiers 170 and 206 to drop below a zero voltage level resulting in a tendency of the output signals of each of the operational amplifiers 170 and 206 to move in a positive-going direction. The output signal from the operational amplifier 206 will swing in a positive-going direction; however, the output signal of the operational amplifier 170 is effectively clamped by the transistor amplifier 608. As a transient state, the control circuit of the indicator apparatus 10f is essentially held in this position until the capacitors 178 and 202 are charged. Thus, a continuous positive pulse is applied to the transistor amplifier 224 until the hold network 42 is activated by biasing the transistor amplifier 218 in the "on" or conducting position. It should be again noted that this last-described position of the indicator apparatus 10f is a transient condition existing for a relatively short period of time, the modified control circuit of the indicator apparatus 10f maintaining a stable action during this transient period of time.

After the intervening transient period of operation, the indicator apparatus 10f is positioned in the sampled position wherein the trigger signal received by the control signal generator 28 has initiated the control signal; the transistor amplifier 226 being biased in the "off" or non-conducting position, the transistor amplifier 218 of the hold network 42 being biased in the "on" or conducting position, the reference network 46 being positioned to develop and produce the reference voltage. The sample signal is now developed generally across the resistor 192 and connected to the meter network 30, the meter network 30 providing the operator-perceivable output indications indicative of the sample signal.

Figure 5:
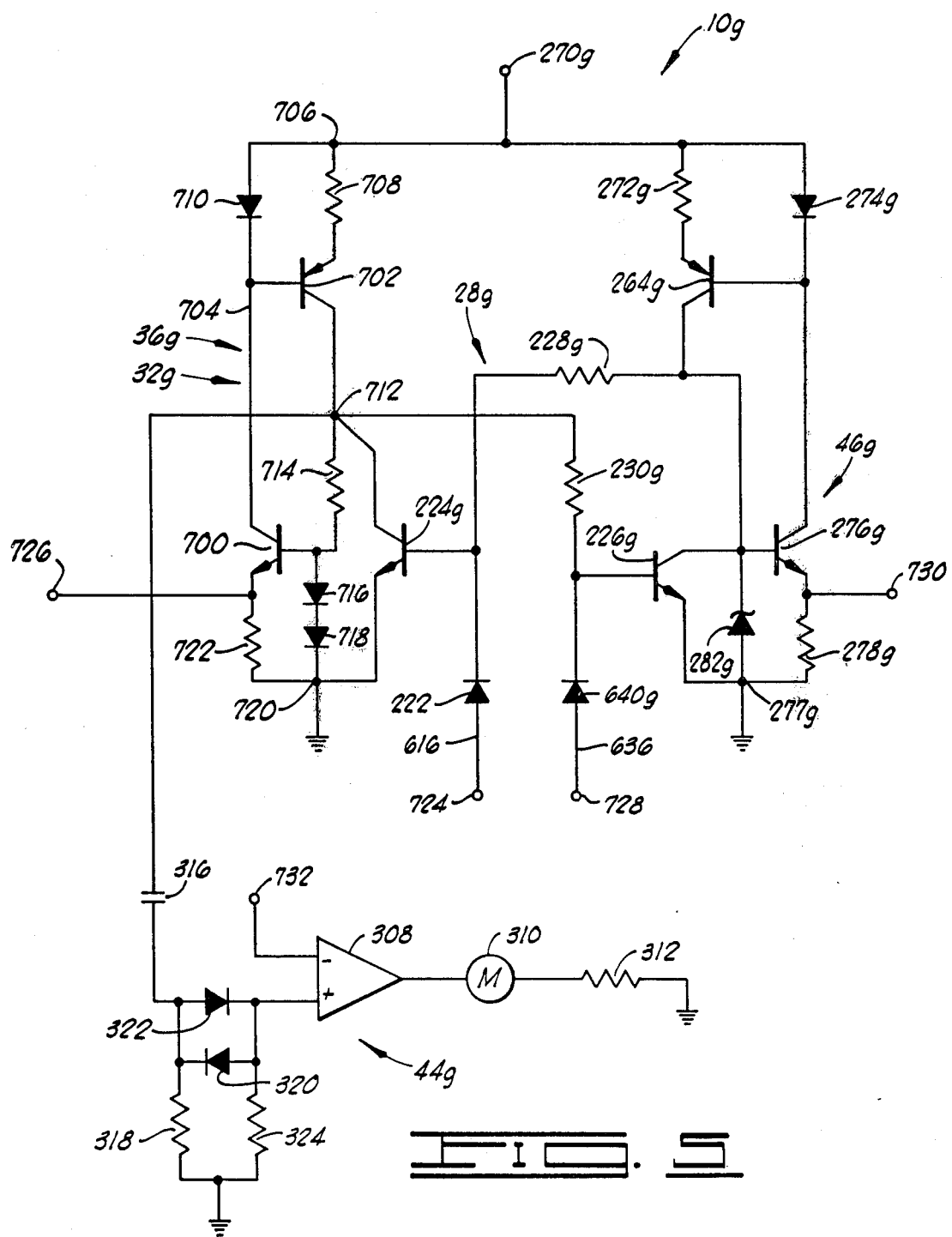
FIG. 5 is a partial, schematic view showing a portion of another modified indicator apparatus.

Embodiment of FIG. 5

Schematically and partially shown in FIG. 5 is another modified indicator apparatus 10g, or, more particularly, a portion of a modified control circuit for the indicator apparatus 10g. The indicator apparatus 10g includes a modified bias control 36g which functions to provide the operating bias to the amplifier network 24 via the active filter network 22, in a manner similar to that described before with respect to the indicator apparatus 10 of FIG. 1, and also provides in cooperation with the meter network 44g the operator-perceivable output indications indicative that the indicator apparatus 10g has been turned on or reset or that the sample signal has been developed in a manner similar to that described before with respect to sample indicator 32 of the indicator apparatus 10 of FIG. 1.

The bias control 36g includes transistor amplifier 700 and a germanium type transistor amplifier 702, the base of the transistor amplifier 702 being connected to the collector of the transistor amplifier 700 via a conductor 704. The emitter of the transistor amplifier 702 is connected to a junction 706 via a resistor 708, the junction 706 being connected to the base of the transistor amplifier 702 via a silicon type diode 710 and to the positive power supply at the terminal 270g.

The base of the transistor amplifier 700 is connected to a junction 712 via a resistor 714 and a pair of diodes 716 and 718 are connected in series to a junction 720 and to the base of the transistor amplifier 700 between the transistor amplifier 700 and the resistor 714, the junction 720 being connected to ground as shown in FIG. 5.

The emitter of the transistor amplifier 700 is connected to the junction 720 via a resistor 722 and the emitter of the transistor amplifier 224g of the control signal generator 28g is connected to the junction 720, the collector of the transistor amplifier 224g and the base of the transistor amplifier 226g each being connected to the junction 712.

The trigger signal generated and produced via the trigger signal generator 40f (shown in FIG. 4) is connected to the control signal generator 28g at the terminal 724. The bias signal generated and produced via the bias control 36g is connected to the amplifier network 24 via the active filter network 22 at the terminal 726. The reset network 34f (shown in FIG. 4) is connected to the control signal generator 28g at the terminal 728. The reference voltage developed via the reference network 46g is applied at the terminal 730 connected to the emitter of the transistor amplifier 276g, the reference voltage being connected to the negative or inverting input of the operational amplifier 308 of the meter network 44g at the terminal 732 in a manner similar to that described before with respect to the indicator apparatus 10 and 10f, shown in FIGS. 1 and 4. It should be noted that, although the trigger signal connected to the junction 724 and the connection of the reset network 34f at the junction 728 have been specifically shown in FIG. 5 with reference to the indicator apparatus 10f, shown in FIG. 4 and described before, the modified bias control 36g and sample network 32g can be incorporated in an indicator apparatus control circuit constructed similar to the indicator apparatus 10, shown in FIG. 1 and described before.

It should be noted that various preferred embodiments of a transducer suitable for operation in connection with the present invention are disclosed in the applicant's copending application entitled "Apparatus for Providing Output Indications Responsive to the Movement of a Moving Body," Ser. No. 294,380, filed on Oct. 2, 1972, referred to before.

Changes may be made in the construction and the arrangement of the parts or the elements of the various embodiments as disclosed herein without departing from the spirit and the scope of the invention as defined in the following claims.

What is claimed is:

1. Apparatus for developing a signal indicative of an input signal, comprising:
   means developing a first signal having a predetermined amplitude;
   means receiving the first signal and the input signal, and integrating the difference between the input signal and the first signal thereby producing an integrated output signal;
   means receiving the integrated output signal and developing a sample signal indicative of the amplitude of the input signal at a predetermined minimum level of the integrated output signal;
   means clamping the integrated output signal at a predetermined level below the predetermined minimum level of the integrated output signal to prevent the integrated output signal from going below the predetermined level for clamping, the sample signal being developed at the predetermined minimum level of the integrated output signal above the predetermined level for clamping the integrated output signal; and
   means receiving the sample signal having a portion holding the sample signal.

2. The apparatus of claim 1 wherein the trigger signal generator means is defined further to include:
   differentiator means receiving the integrated input signal from the peak detector means and producing the output signal in response thereto, the output signal of the differentiator means being responsive to a negative value of the rate-of-change of the integrated input signal with respect to time.

3. The apparatus of claim 2 wherein the trigger signal generator means is defined further to include:
   diode means connected to the differentiator means output signal conducting the trigger signal at a predetermined differentiator means output signal; and
   diode means connected between the integrated input signal and the differentiator means output signal constructed to cooperate with the first-mentioned diode means to assure the integrated input signal and the differentiator means output signal are each at a predetermined "high" level in a conducting position of the first-mentioned diode means.

4. The apparatus of claim 1 wherein the peak detector means is defined further to include:
   inverter amplifier means receiving and inverting the input signal; and
   integrator capacitor means connected generally between the input and the output of the inverter amplifier means, the inverter amplifier means and the integrator capacitor means cooperating to produce the integrated input signal.

5. The apparatus of claim 4 wherein the peak detector means is defined further to include:
   sample capacitor means;
   diode means connecting the sample capacitor means to the integrated input signal at a predetermined level of the integrated input signal, the sample capacitor means being charged when connected to the integrated input signal;
   switch means connected to the sample capacitor means biased closed and conducting a current in response to the charge on the sample capacitor means; and
   means receiving the current from the switch means and developing the sample signal in response thereto.

6. The apparatus of claim 5 wherein the means holding the sample signal is defined further to include:
   switching means connected to the peak detector means, having an on and an off position, clamping the signal connected to the sample capacitor means via the diode means at a level below the predetermined level connecting the sample capacitor means to the integrated input signal preventing further charging of the sample capacitor means in an on position of the switching means; and
   means connected to the switching means positioning the switching means in the on position in response to the development of the sample signal.

7. The apparatus of claim 6 wherein the switching means includes: a switching transistor means connected to the output of the inverter amplifier means, the switching transistor means being biased in the conducting position in the on position of the switching means connecting the output of the inverter amplifier means to ground.

8. The apparatus of claim 1 defined further to include:
- control signal generator means receiving the trigger signal and generating a control signal in response thereto; and
- reference network means receiving the control signal and developing a predetermined reference signal in response thereto; and wherein the means holding the sample signal and providing the output indication is defined further to include a portion receiving the reference signal and holding the sample signal in response thereto.

9. The apparatus of claim 2 wherein the trigger signal generator means is defined further to include:
- diode means connected to the differentiator means output signal conducting the trigger signal at a predetermined forward biased position thereof; and
- transistor amplifier means interposed between the diode means and the integrated input signal of the peak detector means, having a conducting position and an off position, providing a signal to forward bias the diode means conducting the trigger signal in a conducting position of the transistor amplifier means in response to a sensed predetermined level of the integrated input signal connected thereto and a sensed predetermined level of the differentiator means output signal.

10. Apparatus for developing a signal indicative of an input signal, comprising:
- means receiving and integrating the input signal and developing a sample signal indicative of the amplitude of the input signal at a predetermined minimum level of the integrated input signal, said means sensing the integrated input signal and generating a trigger signal in response to the development of the sample signal;
- means receiving the sample signal and the trigger signal and providing an output indication indicative of the received sample signal in response to the received trigger signal;
- amplifier means, having a biased on position, connected to the means receiving and integrating the input signal, the amplifier means receiving and amplifying the input signal in a biased on position thereof;
- bias control means connected to the amplifier means biasing the amplifier means in the on position in an activated position of the bias control means; and
- means receiving the trigger signal and connected to the bias control means deactivating the bias control means in response to a received trigger signal.

11. The apparatus of claim 10 defined further to include:
- active filter network means connected to the amplifier means interposed between the bias control means and the amplifier means, the active filter network means receiving the input signal and the bias control means output signal providing a substantially high impedance to the differential input signals connected thereto and providing a relatively low impedance to common mode input signals and bias control means output signals connected thereto.

12. The apparatus of claim 11 wherein the active filter network means includes:
- bridge network means having a pair of input-output junctions and a pair of control junctions, the input signal and the bridge network means output signal being connected to the input-output junctions; and
- operational amplifier means having an inverting and a non-inverting input and an output, the inverting input being connected to one of the control junctions and the output being connected to the other control junction, the bias control means output signal being connected to the non-inverting input of the operational amplifier means.

13. Apparatus for developing a signal indicative of an input signal, comprising:
- means receiving and integrating the input signal and developing a sample signal indicative of the amplitude of the input signal at a predetermined minimum level of the integrated input signal, said means sensing the integrated input signal and generating a trigger signal in response to the development of the sample signal, comprising:
  - peak detector means receiving and integrating the input signal and developing the sample signal; and
  - trigger signal generator means receiving the integrated input signal and producing an output signal in response thereto, having a portion sensing the integrated input signal and the output signal produced in response to the received integrated input signal, the trigger signal being generated in response to a sensed predetermined level of the integrated input signal and a sensed predetermined level of the output signal produced in response to the received integrated input signal;
- means receiving the sample signal and the trigger signal and providing an output indication indicative of the received sample signal in response to the received trigger signal; and
- low pass filter network means connected to the means receiving and integrating the input signal, comprising:
  - a pair of conductor means carrying the input signal;
  - capacitor means connected between the pair of conductor means; and
  - bifilar wound torroidal core means, having the pair of conductor means wound thereabout, providing a relatively high impedance to common mode input signals and a relatively low impedance to differential input signals.

* * * * *